United States Patent
McGee

(10) Patent No.: US 7,108,838 B2
(45) Date of Patent: Sep. 19, 2006

(54) FEED MIXER FOR A PARTIAL OXIDATION REACTOR

(75) Inventor: Kenneth Scott McGee, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 337 days.

(21) Appl. No.: 10/697,426

(22) Filed: Oct. 30, 2003

(65) Prior Publication Data

US 2005/0095186 A1    May 5, 2005

(51) Int. Cl.
*B01J 19/26* (2006.01)
*C01B 3/32* (2006.01)

(52) U.S. Cl. ............... 422/224; 422/129; 422/220; 422/117

(58) Field of Classification Search .................. None
See application file for complete search history.

(56) References Cited

U.S. PATENT DOCUMENTS

| | | | |
|---|---|---|---|
| 536,945 A | 4/1895 | Avery | |
| 1,312,147 A | 8/1919 | Wallwin | 239/427 |
| 1,874,970 A | 8/1932 | Hall | |
| 1,973,712 A | 9/1934 | Justheim | |
| 2,102,152 A | 12/1937 | Hays | |
| 3,473,323 A | 10/1969 | Briggs et al. | |
| 3,503,557 A | 3/1970 | Hutton, Jr. | |
| 3,509,043 A | 4/1970 | McMaster et al. | |
| 3,554,714 A | 1/1971 | Johnson | 48/180.1 |
| 3,809,524 A | 5/1974 | Bruhlet et al. | |
| 3,871,838 A | 3/1975 | Henkel et al. | |
| 3,881,701 A | 5/1975 | Schoenman et al. | |
| 3,945,942 A | 3/1976 | Marion et al. | |
| 4,100,733 A | 7/1978 | Striebel et al. | |
| 4,166,834 A | 9/1979 | Reed et al. | |
| 4,233,264 A * | 11/1980 | Maude et al. | 422/117 |
| 4,371,379 A | 2/1983 | Brent et al. | |
| 4,388,083 A | 6/1983 | Mauz | |
| 4,390,346 A | 6/1983 | Cramer et al. | |
| 4,419,074 A | 12/1983 | Schuetz | |
| 4,477,262 A | 10/1984 | Pryor | |
| 4,484,885 A | 11/1984 | Machii et al. | |
| 4,521,117 A | 6/1985 | Ouwerkerk et al. | |

(Continued)

FOREIGN PATENT DOCUMENTS

EP    303438 A2    2/1989

(Continued)

OTHER PUBLICATIONS

PCT International Search Report For International Application PCT/US04/29822 dated Dec. 22, 2005 (3 pg.).

*Primary Examiner*—Glenn Caldarola
*Assistant Examiner*—Jennifer A. Leung
(74) *Attorney, Agent, or Firm*—Conley Rose P.C.

(57) ABSTRACT

Methods and apparatus for mixing a plurality of gases, preferably a fuel and an oxidant. The preferred embodiments are characterized by methods and apparatus for mixing at least a methane-containing gas and an oxygen-containing gas, preferably natural gas and molecular oxygen. The preferred embodiments of the present invention include a mixing section having a centrifugal mixer with a tangential inlet where the mixed gases are then injected at an angle into the reactor section. The oxidant and the fuel are mixed by the tangential motion of the fuel to form a reactant gas that then flows through a permeable mixing material that is also disposed within the chamber. The reactant gas injected at an angle into a reactor inlet chamber provides a substantially unobstructed path between the reactor and a pressure relief device.

21 Claims, 5 Drawing Sheets

U.S. PATENT DOCUMENTS

| | | |
|---|---|---|
| 4,722,181 A | 2/1988 | Yu |
| 4,801,092 A | 1/1989 | Webber et al. |
| 4,865,820 A | 9/1989 | Dunster et al. |
| 4,929,088 A | 5/1990 | Smith .................... 366/337 |
| 5,037,619 A | 8/1991 | Alagy et al. |
| 5,106,590 A | 4/1992 | Hopper et al. |
| 5,149,464 A | 9/1992 | Green et al. |
| 5,163,830 A | 11/1992 | Pfefferkorn |
| 5,292,246 A | 3/1994 | Gateau et al. |
| 5,492,649 A | 2/1996 | Christensen |
| 5,523,063 A | 6/1996 | Anderson |
| 5,611,684 A | 3/1997 | Spielman |
| 5,883,138 A | 3/1999 | Hershkowitz et al. |
| 5,886,056 A | 3/1999 | Hershkowitz et al. ...... 518/703 |
| 5,935,489 A | 8/1999 | Hershkowitz et al. ...... 252/373 |
| 5,980,596 A | 11/1999 | Hershkowitz et al. ...... 48/127.9 |
| 6,092,921 A | 7/2000 | Wentinck et al. ........ 366/174.1 |
| 6,203,187 B1 | 3/2001 | Abbasi et al. |
| 6,267,912 B1 | 7/2001 | Hershkowitz et al. ...... 252/373 |
| 6,329,434 B1 | 12/2001 | Wen et al. .................. 518/703 |
| 6,471,937 B1 | 10/2002 | Anderson et al. |
| 6,620,389 B1 | 9/2003 | Lesieur |
| 6,692,661 B1 | 2/2004 | Bedetti |
| 6,824,675 B1 | 11/2004 | Boyer et al. |
| 2001/0021360 A1 | 9/2001 | Yuill et al. |
| 2002/0187090 A1 | 12/2002 | Bussche et al. |
| 2002/0192154 A1 | 12/2002 | Kramer et al. |
| 2003/0056439 A1 | 3/2003 | Wilhelm et al. |
| 2003/0170155 A1 | 9/2003 | Sevenhuijen et al. |
| 2004/0047778 A1 | 3/2004 | Wolf et al. |
| 2004/0068934 A1 | 4/2004 | Wolf et al. |
| 2004/0075084 A1 | 4/2004 | Kramer et al. |

FOREIGN PATENT DOCUMENTS

| | | |
|---|---|---|
| EP | 303439 B1 | 2/1989 |
| EP | 463247 B1 | 1/1992 |
| EP | 896192 A2 | 2/1999 |
| GB | 1469097 | 3/1977 |
| WO | WO 94/09326 A1 | 4/1994 |
| WO | WO 97/37929 A1 | 10/1997 |
| WO | WO 98/30322 A1 | 7/1998 |
| WO | WO 98/49091 A1 | 11/1998 |
| WO | WO 98/49095 A1 | 11/1998 |
| WO | WO 98/49096 A1 | 11/1998 |
| WO | WO 01/18451 | 3/2001 |
| WO | WO 200211878 A1 * | 2/2002 |
| WO | WO 200247805 A2 * | 6/2002 |

\* cited by examiner

FEED MIXER FOR A PARTIAL OXIDATION REACTOR

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates generally to methods and apparatus for mixing gases. More specifically, the present invention relates to methods and apparatus for mixing a feed gas to supply a catalytic partial oxidation process.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas and is not economical for formations containing small amounts of natural gas.

Formations that include small amounts of natural gas may include primarily oil, with the natural gas being a byproduct of oil production that is thus termed associated gas. In the past, associated gas has typically been flared, i.e., burned in the ambient air. However, current environmental concerns and regulations discourage or prohibit this practice.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that in addition to their value, they can be transported more easily in a pipeline than natural gas, since they do not require liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen.

Catalytic partial oxidation is one process used to form syngas and attempts to perform all of the partial oxidation reactions on a highly active catalyst in order to convert the hydrocarbon catalytically at a high rate. For example the contact times of catalytic partial oxidation may be on the order of milliseconds. Thus, for catalytic partial oxidation, it is preferable to premix a hydrocarbon-containing feed, such as methane or natural gas, with a molecular oxygen-containing feed at high temperature, pressure and velocity in order to enable the catalytic reaction to proceed at short contact times so that the chemistry occurs at the correct stoichiometry throughout the catalytic zone.

Therefore, an often desired component of a commercial scale operation is an apparatus to premix the hydrocarbon-containing gas, such as methane or natural gas, and the molecular oxygen-containing gas, such as air or substantially pure $O_2$, at high temperature, pressure, and velocity. The same feed conditions that are conducive to efficient operation of the partial oxidation process, however, could lead to reactions that are less desirable, and possibly even hazardous, such as the ignition and combustion of the feedstock. At the same time, it is desirable to mix the feed gases as completely as possible, so as to maximize the efficiency of the catalytic reaction.

One problem with such mixing processes is that heated mixtures of oxygen and methane, at pressures of interest for syngas production, are highly reactive and can be explosive. Thus, it is often preferred to utilize techniques that increase the controllability of the process and to avoid pre-ignition and pre-reaction of the gases. One technique used in mixing the reactants is to place the mixing nozzles very close to the reaction zone such that there is a very short time between the reactants being mixed and contacting the catalyst. This technique often involves placing the mixing apparatus in close proximity to the reactor, which may make maintenance of the mixing apparatus difficult and requires that the mixer be designed to withstand the extreme environment of a partial oxidation reactor.

Another problem encountered in the design of these types of mixers is that high concentrations of oxygen, or oxygen rich gas, impacting components of the mixer at high velocities can cause damage to components of the mixer. This high speed contact can lead to oxygen impingement and a thermochemical reaction that may damage, and even destroy, components of the mixer.

Another concern in the design of mixing apparatus for catalytic partial oxidation reactions is allowing for the release of gases in the case of an emergency or backlight situation, where the gases in the mixing apparatus ignite and cause a dramatic increase in pressure. Because a catalytic partial oxidation reaction is potentially highly reactive, it is often preferred to provide for the release of gases in the event that the reaction becomes uncontrollable.

Thus, there remains a need in the art for methods and apparatus to improve the mixing of natural gas and oxygen to feed a catalytic partial oxidation process. Therefore, the embodiments of the present invention are directed to methods and apparatus for mixing that seek to overcome these and other limitations of the prior art.

SUMMARY OF THE PREFERRED EMBODIMENTS

Accordingly, there are provided herein methods and apparatus for mixing a plurality of gases, preferably a hydrocarbon and an oxidant. The preferred embodiments of the present invention are characterized by a mixing section having a centrifugal mixing region with a tangential inlet. The gases from the mixing section are preferably injected at an angle into a reactor inlet section that feeds a reactor.

One embodiment includes a mixing device having a tubular mixing chamber with a tangential inlet, which injects a stream of fuel such that the stream of fuel that flows tangentially along the inside of the tubular mixing chamber, and an axial inlet, which injects a stream of oxidant along the longitudinal axis of the tubular mixing chamber. The oxidant and the fuel are mixed by the tangential motion of the fuel and form a reactant feed gas suitable for use in a reactor. The tubular mixing chamber may also include one or more secondary flow conditioners to further develop the flow before it enters a reactor. Preferred secondary flow conditioners include permeable mixing material, such as ceramic beads.

An alternative embodiment includes a mixing device having a tubular reactor inlet chamber with a lower end connected to the reactor and an upper end having a pressure relief device. A tubular mixing chamber is connected to the reactor inlet chamber at a reactant gas inlet so that the longitudinal axis of the mixing chamber is at an angle to the longitudinal axis of the reactor inlet chamber. The mixing chamber has an axial inlet, which injects an oxidant into the mixing chamber along its longitudinal axis, and a tangential inlet, which injects the fuel tangentially along the inside of the mixing chamber. The mixing chamber may also include a secondary flow conditioner, such as permeable mixing material, disposed between the tangential inlet and the reactant gas inlet. The reactor inlet chamber is preferably substantially free of obstructions between the lower end and the upper end.

Another embodiment includes a method for mixing a reactant gas for a partial oxidation reactor by injecting an oxidant along the longitudinal axis of a tubular mixing chamber and injecting a fuel tangentially along the inside of the tubular mixing chamber so that the fuel mixes with the oxidant to form a reactant gas. The reactant gas is then injected into a tubular reactor inlet chamber at an angle to the longitudinal axis of the inlet chamber and then injected into the reactor. The reactant gas may also be further conditioned by a secondary flow conditioner within the tubular chamber.

Another embodiment includes a process for making synthesis gas by simultaneously injecting an oxidant and a fuel into a mixing chamber; wherein the injection of fuel is done in such a manner that the fuel flows tangentially to the oxidant. The oxidant and the fuel are mixed to form a reactant gas that is fed into a synthesis gas reactor to convert at least a portion of the reactant gas to a gas comprising hydrogen and carbon monoxide. The synthesis gas reactor may include a catalyst. In certain embodiments, the oxidant comprises molecular oxygen and the fuel comprises methane or natural gas. The process may also include converting at least a portion of the gas comprising hydrogen and carbon monoxide to a product selected from the group comprising synthetic fuels, methanol, olefins, hydrocarbon waxes, lubricating oils, and combinations thereof.

Thus, the present invention comprises a combination of features and advantages that enable it to substantially increase the efficiency of mixing natural gas and oxygen to feed a catalytic partial oxidation process. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1A:
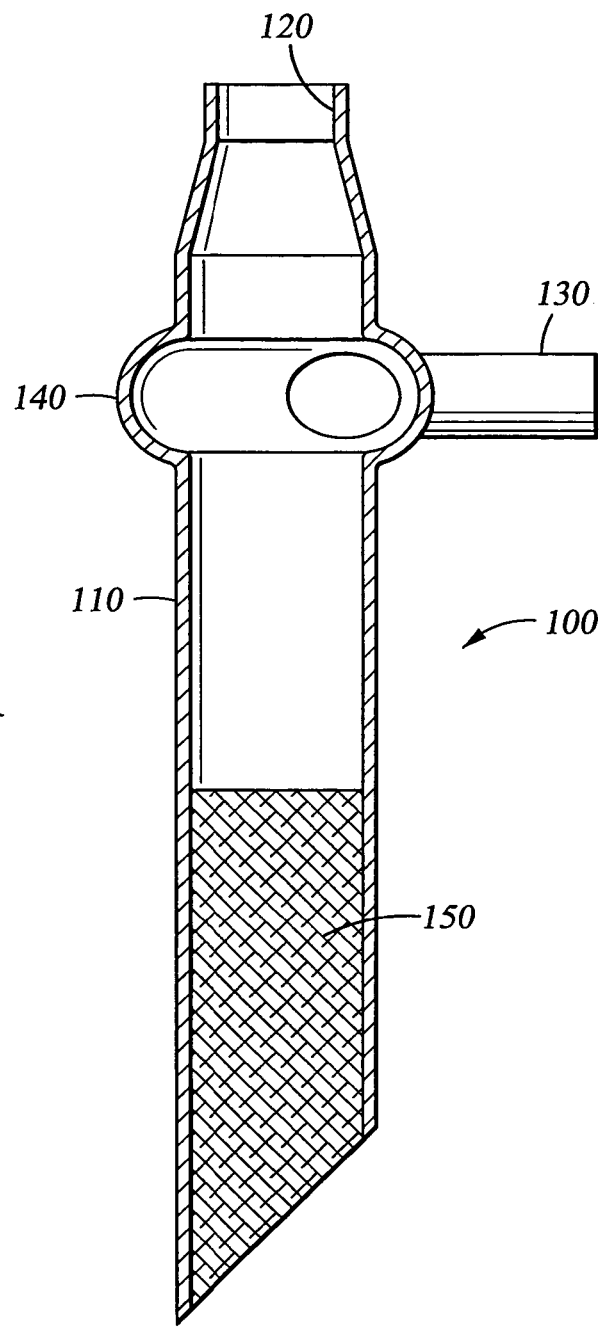
FIGS. 1A and 1B are cross-sectional views of one embodiment of a mixing section constructed in accordance with the present invention.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for mixing natural gas and oxygen to supply a feed gas to a catalytic partial oxidation reaction. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different methods and apparatus for mixing gases. Reference is made to mixing natural gas and oxygen for a catalytic partial reaction, but the use of the concepts of the present invention is not limited to mixing solely natural gas and oxygen, or for use solely with a catalytic partial oxidation process, and can be used in any other mixing application. It is to be fully recognized that the different teachings of the embodiments discussed below may be employed separately or in any suitable combination to produce desired results.

Figure 1B:
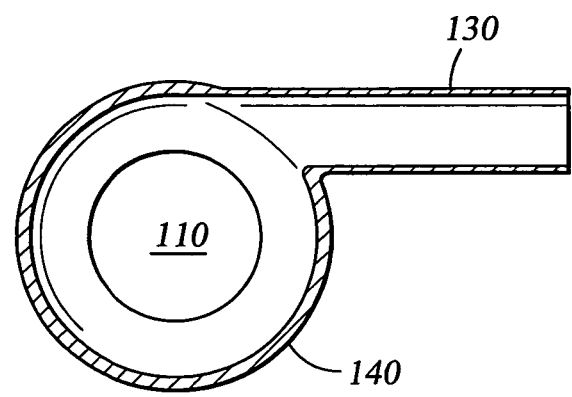

FIGS. 1A and 1B depict a mixing section 100 having an elongated tubular chamber 110, an axial inlet 120, a tangential inlet 130, a centrifugal mixing region 140, and secondary flow conditioner 150. Secondary flow conditioner 150 is shown as a permeable mixing material, such as ceramic beads, but may be of any desired form. A gaseous oxidant is injected through axial inlet 120 into tubular chamber 110. Axial inlet 120 is preferably proximate to centrifugal mixing region 140. A stream of fuel, such as natural gas, is injected through tangential inlet 130 into centrifugal mixing region 140 so as to form a stream of fuel flowing tangentially around the inside wall of mixing region 140. The fuel stream acts to surround the oxidant stream and prevents the oxidant stream from impinging on the wall of chamber 110. The tangential spinning motion of the fuel stream causes the fuel stream and the oxidant stream to mix as the gases travel downstream in tubular chamber 110.

Within mixing region 140, it is preferred that the oxidant and fuel are mixed in proportions or conditions that are non-explosive. For example, it is often preferred that a preheated feed gas be provided to the reactor, but heated oxygen can be highly reactive. It is therefore preferable to provide a preheated fuel mixture to be mixed with a relatively cold, such as about ambient temperature, oxygen, thus providing a relatively benign mixing environment. It is also important to ensure that the oxidant and fuel be mixed in proportions that will not be subject to auto-ignition.

It is therefore desired to mix the gases such that the concentration of fuel is maintained within non-explosive limits. To ensure sufficient quantities of fuel, the centrifugal mixer may include more than one tangential inlet supplying fuel to the mixer. The tangential inlets may be round, oval, or slotted as may be required to ensure safe and sufficient mixing.

Secondary flow conditioner 150 is located at the downstream end of chamber 110. Secondary flow conditioner 150 is preferably located at least a distance of twice the diameter of chamber 110 from region 140. This distance is provided to allow the flow leaving mixing region 140 to more thoroughly mix before contacting conditioner 150. Secondary flow conditioner 150 may preferably be a permeable mixing material having a plurality of interstitial pathways through which the reactant gas can flow and become thoroughly mixed. Permeable mixing material may be ceramic foam, ceramic beads, packing saddles, or any other non-reactive material that will allow sufficient gas flow through the material while providing adequate interstitial areas to promote mixing. The permeable mixing material may be held in place by screens, or any other means, constructed from a non-reactive material. Alternatively, secondary flow conditioner may also be some other structure adapted to improve the mixing or conditioning of the reactant flow.

Figure 2:
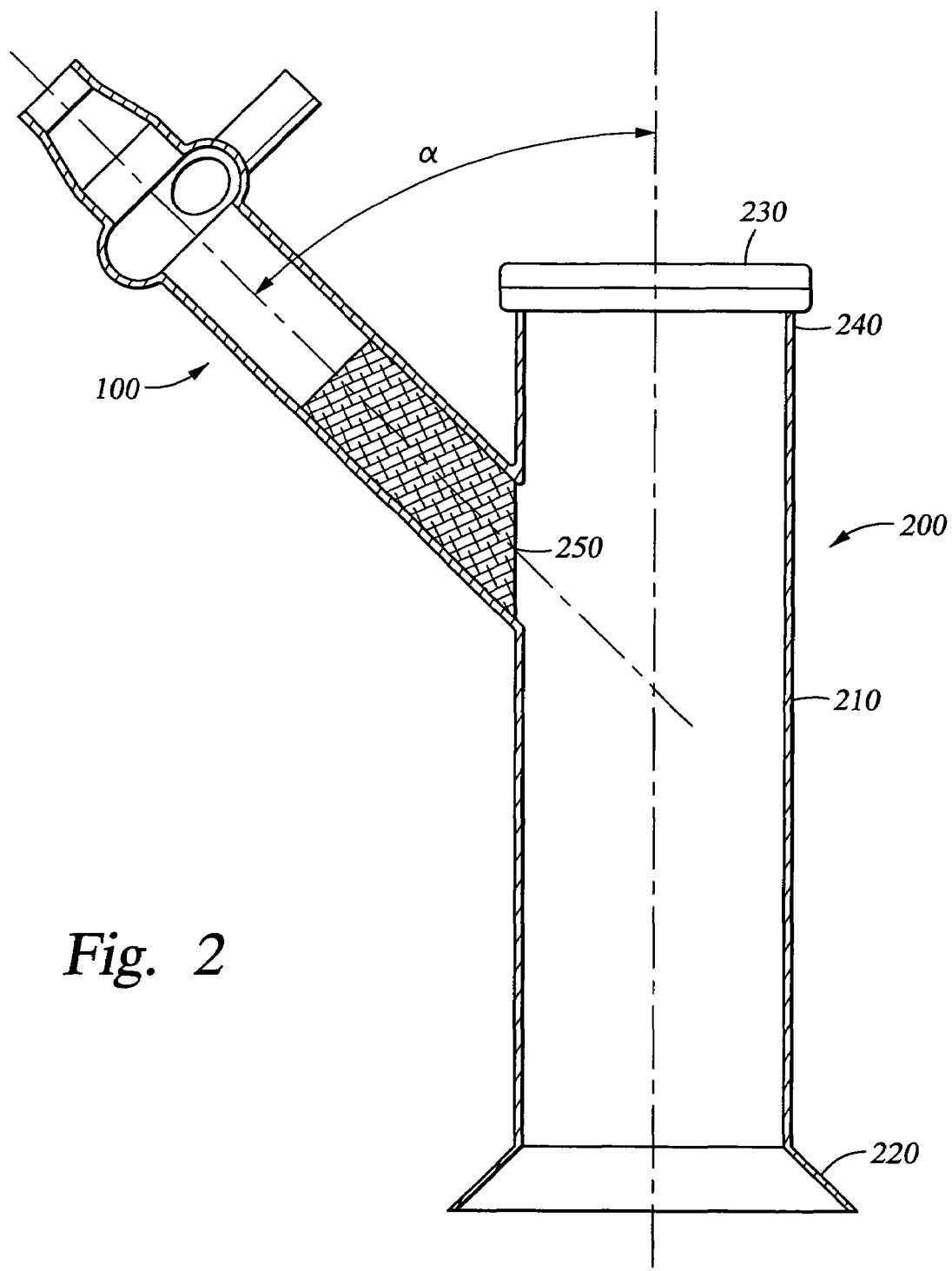
FIG. 2 is a cross-sectional view of one embodiment of a reactor inlet section.

Referring now to FIG. 2, mixing section 100 is shown installed on reactor inlet section 200 that includes an inlet chamber 210. Inlet chamber 210 is preferably an elongated tubular chamber that feeds a reactor (not shown) at its lower end 220 and has a pressure relief device 230 disposed on its upper end 240. Mixing section 100 connects to inlet chamber 210 at reactant inlet 250 at an angle $\alpha$ such that the gases exiting mixing section 100 flow smoothly toward lower end 200 and the reactor. This angle $\alpha$ can be any angle between 0 and 90° from the longitudinal axis of inlet chamber 210. The longitudinal axis of mixing section 100 is preferably at an angle $\alpha$ between 30 and 60 degrees from the longitudinal axis of inlet chamber 210.

The arrangement of inlet chamber 210 and mixing section 100 allows a clear path from the reactor to upper end 240 and pressure relief device 230 so that, in the case of an emergency or backlight situation, the path between the reactor and the pressure relief device is not obstructed. Pressure relief device 230 is preferably located as close to reactant inlet 250 as possible in order to minimize the area available for gas to collect above the reactant inlet and below the pressure relief device. The area between reactant inlet 250 and pressure relief device 230 may also preferably have a means for injecting a sweep gas in order to prevent flammable gases from collecting near the pressure relief device. In a backlight situation, the sweep gas will prevent excessive heat from reaching pressure relief device 230, which could reduce the performance characteristics of the device. One preferred sweep gas is nitrogen.

Reactant inlet 250 is preferably located at a distance of at least twice the diameter of inlet chamber 210 from lower end 220 so as to provide a well distributed flow profile as the reactant gases enter the reactor. The inner wall of inlet chamber 210 may also have additional mixing means to further condition the flow of feed gas entering the reactor. These additional mixing means are preferably close to the wall so as not to interfere with the unobstructed path between the reactor and the pressure relief device.

Reactor inlet section 200 preferably supplies a well-mixed flow of reactant gas that is fully distributed across the inlet to the reactor. The reactant gas is also preferably supplied at a velocity that is greater than the flame velocity within the reactor so as to further increase safety.

Figure 3:
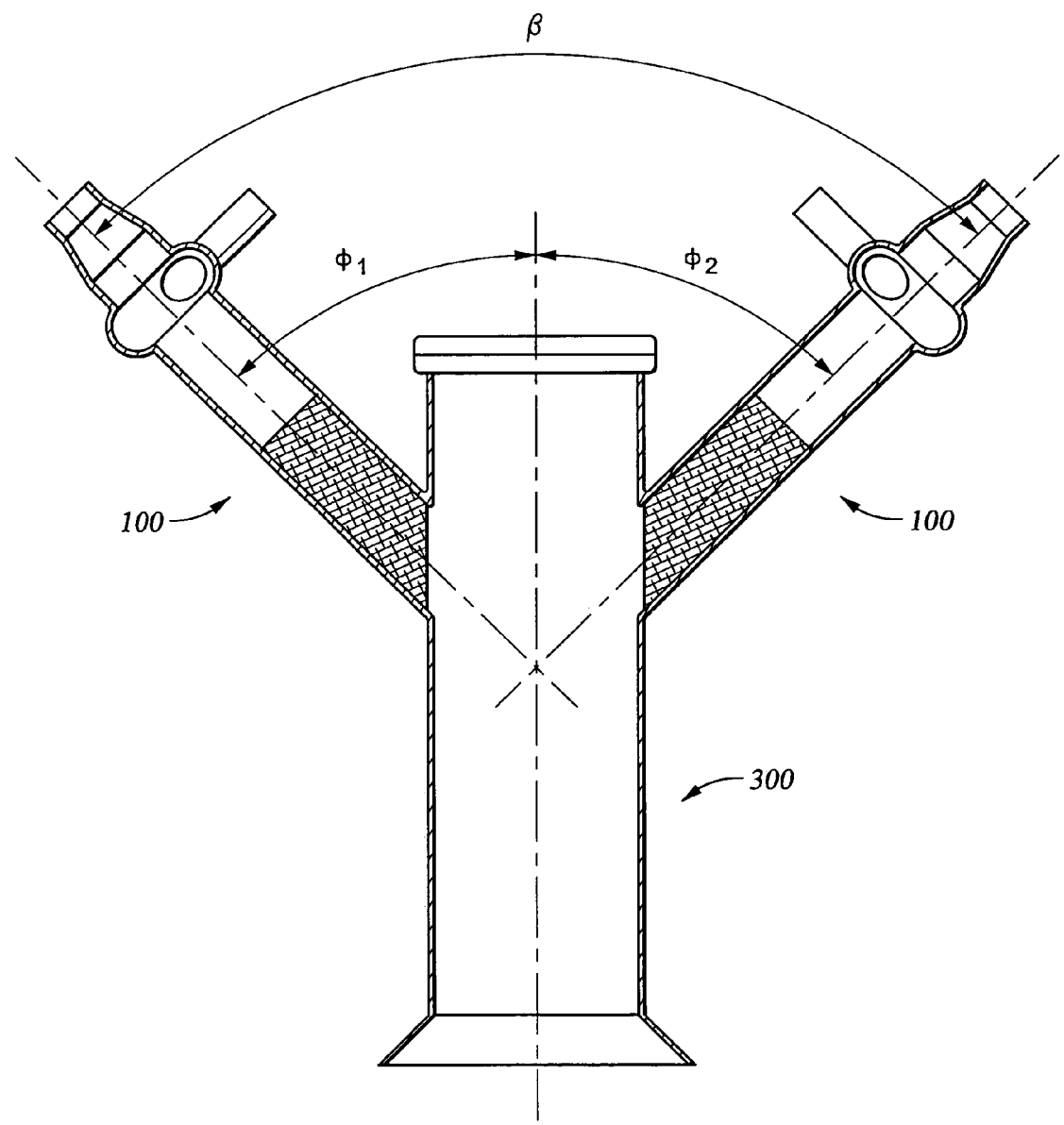
FIG. 3 is a cross-sectional view of a second embodiment of a reactor inlet section

FIG. 3 shows an alternative embodiment of a reactor inlet section 300 that is fed by multiple mixing sections 100. The multiple mixing sections 100 may be located so that the flow from each mixing section enters on opposite sides of inlet section 300. Mixing sections 100 are each arranged at an angle $\Phi_1$, $\Phi_2$ from the longitudinal axis of inlet section 300. Angles $\Phi_1$, $\Phi_2$ can be any angle between 0 and 90° from the longitudinal axis of inlet section 300, and may preferably be arranged at angle between 30 and 60 degrees from the longitudinal axis of inlet section 300. The total angle $\beta$ between the longitudinal axes of mixing sections 100 should be less than 180°, and is preferably less than 120°, and more preferably between 60° and 120°.

Figure 4:
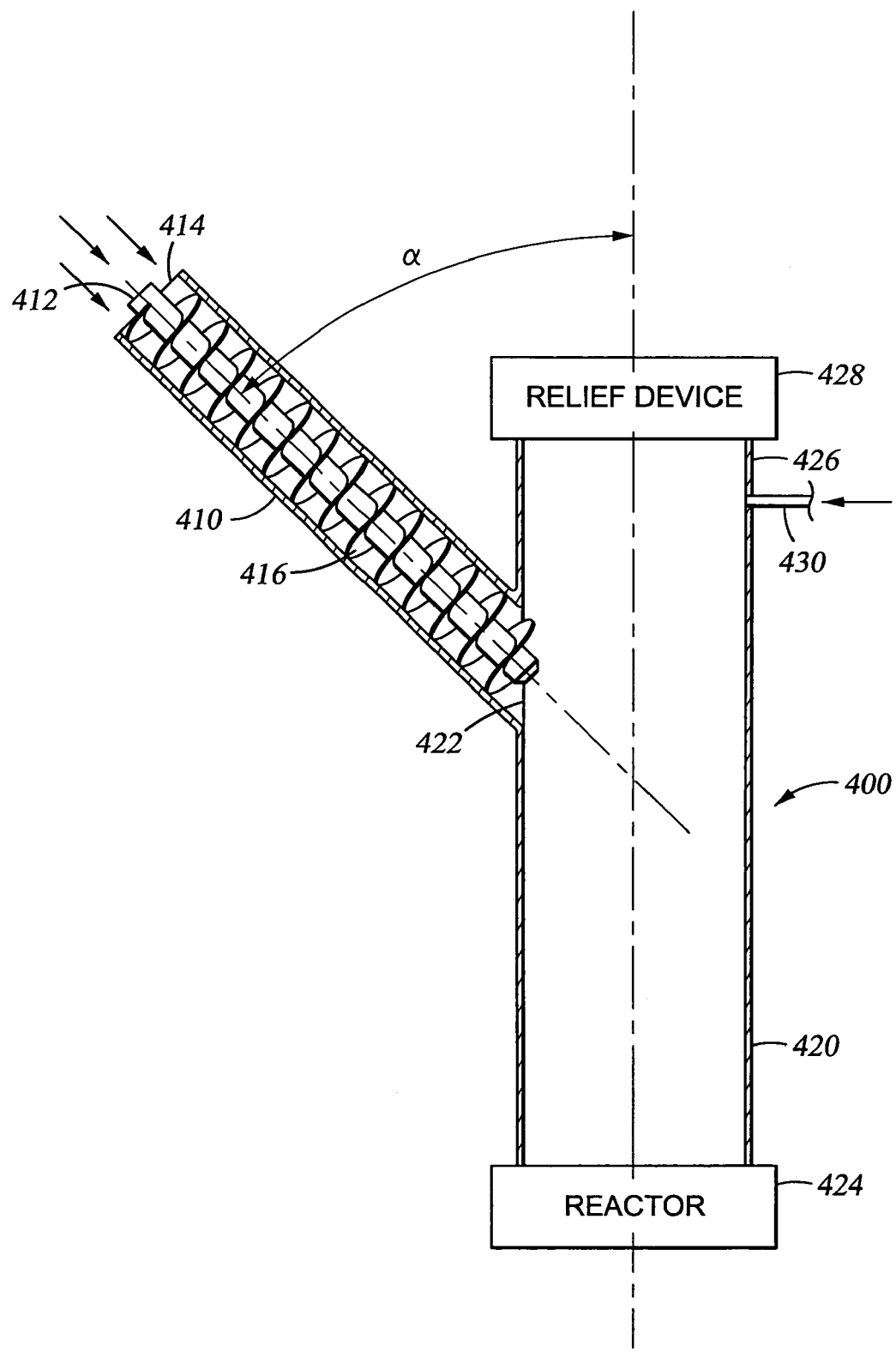
FIG. 4 is a cross-sectional view of a third embodiment of a reactor inlet section.

Referring now to FIG. 4, an alternate embodiment of a reactor inlet section 400 including an offset mixing section 410 and an inlet chamber 420. Mixing section 410 includes a centrally located oxidant inlet 412 and a fuel inlet 414. Inlet chamber 420 includes inlet 422, reactor inlet 424, and secondary outlet 426. Secondary outlet 426 is preferably in communication with a relief device 428. Inlet chamber 420 may also include a sweep gas inlet 430.

Fuel inlet 414 comprises one or more spirals 416 wrapped around oxidant inlet 412 to cause the fuel to swirl in a spiral or "corkscrew" fashion. The momentum created in the fuel as it travels along spiral 416 causes the fuel to continue its swirling motion once it enters inlet chamber 420. This swirling motion of the fuel causes the oxidant and fuel streams to mix once they enter inlet chamber 420 at reactant inlet 422. The gases continue to mix as they travel from reactant inlet 422 toward reactor inlet 424.

Reactant inlet 422 is preferably spaced a sufficient distance from reactor inlet 424 to allow sufficient mixing of the reactant gases. Inlet chamber 420 may also include additional mixing equipment between reactant inlet 422 and reactor inlet 424 to ensure the reactants are fully mixed before entering the reactor.

Reactant inlet 422 is preferably located close to the upper end of inlet chamber 420 in order to minimize the volume between reactant inlet 422 and secondary outlet 426. Sweep gas inlet 430 is preferably located in this region between reactant inlet 422 and secondary outlet 426. Sweep gas inlet 430 allows an inert gas to be injected into inlet chamber 420 in order to push reactant gases out of the region above reactant inlet 422.

Figure 5:
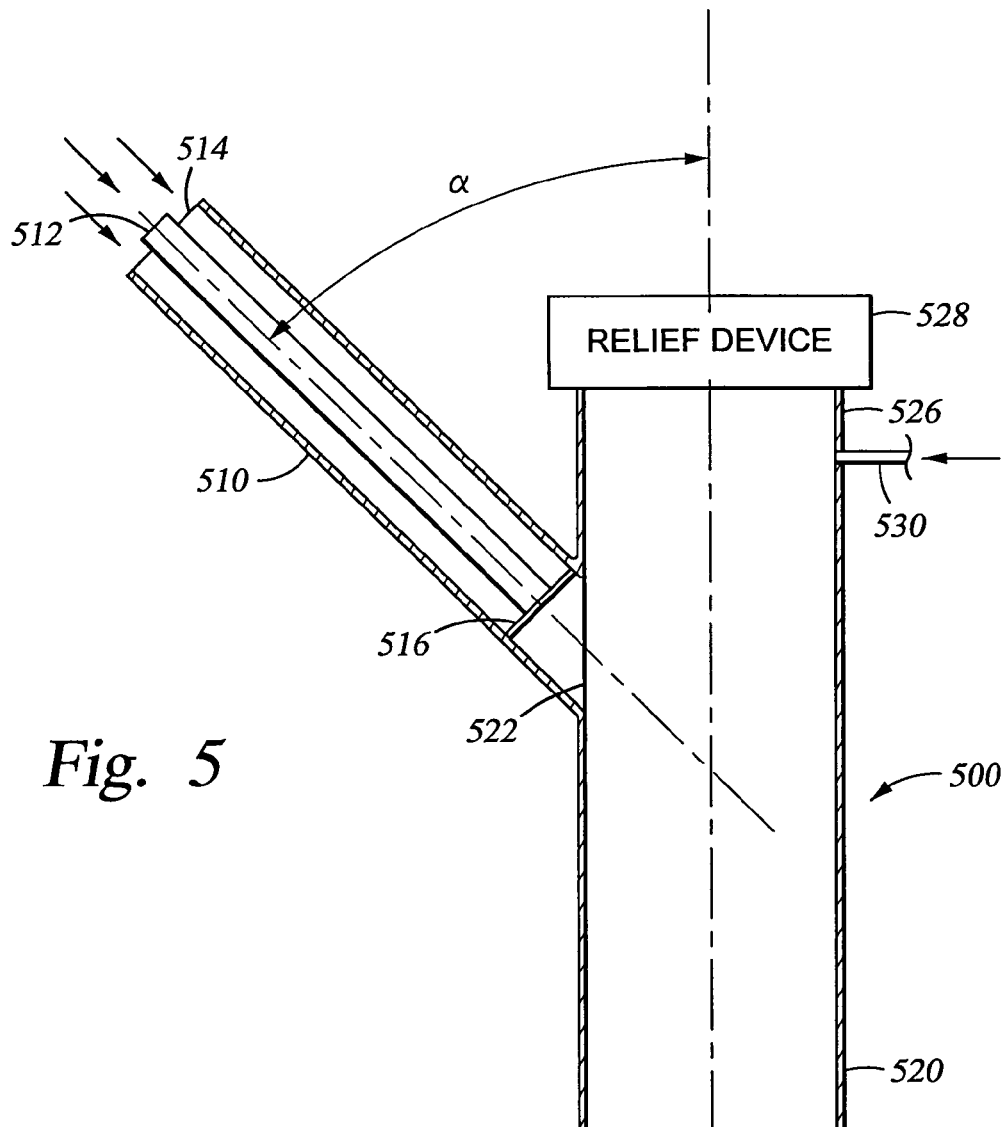
FIG. 5 is a cross-sectional view of a fourth embodiment of a reactor inlet section.
Figure 6:
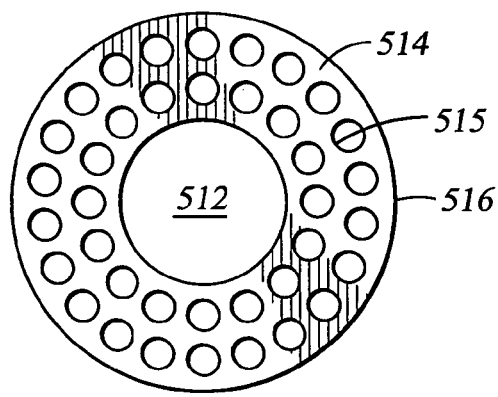
FIG. 6 is an elevation view of the mixing plate of FIG. 5.

Referring now to FIG. 5 and FIG. 6, an alternative reactor inlet section 500 is shown. Inlet section 500 includes an offset mixing section 510 and an inlet chamber 520. Mixing section 510 includes a centrally located oxidant inlet 512 and an annular fuel inlet 514. Mixing plate 516 is positioned at the junction between inlet chamber 520 and offset mixing section 510. Inlet chamber 520 includes reactant inlet 522, reactor inlet 524, and secondary outlet 526. Secondary outlet 526 is preferably in communication with a relief device 528. Inlet chamber 520 may also include a sweep gas inlet 530.

Mixing plate 516, which can be seen in FIG. 6, covers both central oxidant inlet 512 and annular fuel inlet 514.

Oxidant is allowed to freely flow while the fuel flow is interrupted by a plurality of orifices 515. Orifices 515 create a turbulent flow in the fuel, which causes the fuel to mix with the oxidant as the oxidant and fuel flows combine and move into inlet chamber 520.

Reactant inlet 522 is preferably spaced a sufficient distance from reactor inlet 524 to allow sufficient mixing of the reactant gases as the turbulent flow moves toward reactor inlet 524. Inlet chamber 520 may also include additional mixing equipment between reactant inlet 522 and reactor inlet 524 to ensure the reactants are fully mixed before entering the reactor. Reactant inlet 522 is preferably located close to the upper end of inlet chamber 520 in order to minimize the volume between reactant inlet 522 and secondary outlet 526. Sweep gas inlet 530 is preferably located in this region between reactant inlet 522 and secondary outlet 526. Sweep gas inlet 530 allows an inert gas to be injected into inlet chamber 520 in order to push reactant gases out of the region above reactant inlet 522.

Downstream of the present mixing section, the mixed oxidant and fuel form a reactant gas mixture in the inlet chamber, and can be injected through a reactor inlet into a reactor. This reactant gas mixture can then be reacted in the reactor under any suitable partial oxidation conditions, such as are known in the art, to produce a gas comprising a mixture of carbon monoxide and hydrogen (syngas). Preferably the reaction takes place in the presence of any suitable partial oxidation catalyst. The reactor is preferably operated at a reactant gas pressure greater than 1 atmosphere (>100 kPa), more preferably above 2 atmospheres, which is advantageous for optimizing syngas production space-time yields. The reactor preferably comprises a fixed bed comprising the partial oxidation catalyst. Preferably the fuel comprises one or more light hydrocarbons; more preferably a methane-containing gas, such as methane or natural gas. The oxidant preferably comprises molecular oxygen.

At least the fuel stream is preferably preheated to about 30° C.–750° C. before mixing with the oxidant stream before forming the reactant gas mixture. The reactant gas mixture passes over the catalyst to the point at which the partial oxidation reaction initiates. An overall or net catalytic partial oxidation (CPOX) reaction ensues, and the reaction conditions are maintained to promote continuation of the process, which preferably is sustained autothermally. The term "autothermal" means that after initiation of the partial oxidation reaction, no additional or external heat must be supplied to the catalyst in order for the production of synthesis gas to continue.

The net partial oxidation reaction conditions are promoted by optimizing the concentrations of hydrocarbons and oxygen in the reactant gas mixture, preferably with a molar ratio in the range of from about 1.5:1 to about 3.3:1 carbon:O2. In some embodiments, steam may also be added to produce extra hydrogen and to control (i.e., reduce) the outlet temperature of the reactor. The steam can be added as an additional flow stream in the mixing chamber, can be premixed with one of the feed gases upstream of the mixing chamber, or can be added separately, as desired. Regardless, it is preferred that the ratio of steam to carbon (by weight) range from 0 to 3.

Pressure, residence time, amount of feed preheat and amount of nitrogen dilution, if used, also affect the reaction products. The process also preferably includes maintaining a residence time of no more than about 200 milliseconds for the reactant gas mixture and in some reactor schemes even less. This is accomplished by passing the reactant gas mixture over, or through the porous structure of the catalyst system at a gas hourly space velocity of about 20,000–100,000,000 h$^{-1}$, preferably about 100,000–25,000,000 h$^{-1}$; more preferably about 400,000–10,000,000 h$^{-1}$. In preferred embodiments of the process, the catalyst system catalyzes the net partial oxidation of at least 80% of a methane-comprising fuel stream with an O$_2$-containing oxidant stream to CO and H$_2$ with a selectivity for CO and H$_2$ products of at least about 80% CO and 80% H$_2$.

The reactant gas mixture flow rate is preferably maintained such that the time of contact between the reactant gas mixture and the catalyst is no more than about 200 milliseconds, more preferably under 50 milliseconds, and still more preferably 20 milliseconds or even less. This degree of contact produces a favorable balance between competing reactions and produces sufficient heat to maintain the catalyst at the desired temperature. Exposure to the hot catalyst and oxygen partially oxidizes the light hydrocarbons in the feed according to the CPOX reaction (Reaction 1, in the case of methane):

$$CH_4 + \tfrac{1}{2}O_2 \rightarrow CO + 2H_2 \tag{1}$$

In some embodiments, the process comprises mixing a methane-containing fuel and an O$_2$-containing oxidant together in a carbon:O$_2$ molar ratio of about 1.5:1 to about 3.3:1, preferably about 1.7:1 to about 2.1:1, and more preferably about 2:1. Preferably the methane-containing fuel is at least 80% methane, more preferably at least 90%.

In certain embodiments of the process, the step of maintaining net partial oxidation reaction promoting conditions includes keeping the temperature of the reactant gas mixture at about 30° C.–750° C. and keeping the temperature of the catalyst at about 600° C.–2,000° C., preferably between about 600° C.–1,600° C., by self-sustaining reaction. The exit gas temperature can be between 500° C. and 1,500° C., preferably between 700° C. and 1,100° C. In some embodiments, the process includes maintaining the reactant gas mixture at a pressure of about 100–40,000 kPa (about 1–40 atmospheres), preferably about 200–30,000 kPa (about 2–30 atmospheres), and still more preferably between about 8 and 29 atmospheres, while contacting the catalyst. The syngas stream resulting from this process preferably contains hydrogen and carbon monoxide in a molar ratio of about 1:1 to about 3:1, more preferably between about 1.4:1 and about 2.3:1.

In addition, the so-produced syngas-containing stream may be fed to a synthesis reactor, in which the synthesis can be, by way of example only, Fischer-Tropsch synthesis, alcohol (particularly methanol) synthesis, hydrogen production, hydroformylation, or any other use for syngas. Any Fischer-Tropsch reactor that is known in the art could be used in order to convert at least a portion of the syngas produced by a method and/or using a reactor device according to this invention to Fischer-Tropsch products (e.g., higher molecular-weight hydrocarbons, such as, for example, C$_{5+}$ hydrocarbons). A preferred Fischer-Tropsch reactor comprises a catalyst comprising cobalt, ruthenium, or iron in a fixed bed, fluidized bed or a slurry bed. The Fischer-Tropsch reactor is preferably operated at a temperature typically in the range from about 160° C. to about 300° C.; at a pressure typically in the range of about 80 psia (552 kPa) to about 1000 psia (6895 kPa); and a gas hourly space velocity typically from about 50 to about 10,000 of volume of reactant gas at standard pressure and temperature per bed volume per hour. The Fischer-Tropsch products can be further processed to yield diesel, gasoline, lubricating oils, waxes, to name a few of the valuable products which can be derived from Fischer-Tropsch synthesis.

The present invention has been disclosed in terms of its role in a partial oxidation process, particularly catalytic partial oxidation. It will be understood that the present invention has applicability in any catalytic reaction scheme, in which it is desired to mix or distribute an oxidant and a fuel prior to contacting them with the catalyst, and particularly those reaction schemes in which it may be desired to minimize impingement of an oxidant gas contacting a metal-containing surface at high velocity. When one of the reactants is an oxygen-containing gas, exemplary reaction schemes include, in addition to partial oxidation of methane or natural gas, oxidative dehydrogenation of light hydrocarbons and catalytic partial oxidation of hydrogen sulfide.

For the oxidative dehydrogenation of light hydrocarbons, the fuel preferably comprises one alkane with 2 to 4 carbon atoms or any mixture thereof (such as substantially pure ethane; any mixture of ethane and butane; or natural gas liquids) and an oxygen-containing gas (such as substantially pure $O_2$; $O_2$-enriched air; air; any mixture of $O_2$ and an inert gas for example nitrogen; any mixture of water and $O_2$; or any combinations thereof) for use in an oxidative dehydrogenation (ODH) process, preferably comprising a catalyst, for the production of olefins. Particular embodiments of the ODH catalyst, process and modes of operations are disclosed in co-owned published patent applications 2003-0040655 (CR#1856-16500) and 2003-0065235 (CR#1856-16600), wherein each is incorporated herein by reference in its entirety. The olefins product also may be employed in subsequent processes such as the production of polyolefins, ethylene glycol, ethylene oxide, or combinations thereof.

Suitable examples of catalytic partial oxidation of hydrogen sulfide are disclosed in co-owned U.S. Pat. No. 6,403,051 and published U.S. patent application 2002/0119091, wherein each is incorporated herein by reference in its entirety. They both disclose a method comprising mixing the stream containing hydrogen sulfide and a light hydrocarbon stream and an oxygen containing stream to form a feed stream; contacting the feed stream with a catalyst; and raising the temperature of the stream sufficiently to allow oxidation of the hydrogen sulfide and partial oxidation of the light hydrocarbon to produce a product stream containing elemental sulfur, CO and hydrogen.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A reactor suitable for mixing and reacting a fuel and an oxidant, comprising:
    a reactor body having a longitudinal axis;
    a pressure relief device in fluid communication with said reactor body;
    an inlet chamber comprising a reactant inlet; a lower end connected to said reactor body; and an upper end connected to said pressure relief device, said inlet chamber having a longitudinal axis aligned with the longitudinal axis of said reactor body; and
    a mixing section connected to said inlet chamber at said reactant inlet, said mixing section having a longitudinal axis at an angle of less than 90° to the longitudinal axis of said inlet chamber, wherein said mixing section comprises:
        an oxidant inlet adapted to inject a stream of oxidant into said mixing section along the longitudinal axis of the mixing-section; and
        a fuel inlet adapted to inject a stream of fuel into said mixing section such that the stream of fuel flows tangentially to the stream of oxidant and mixes with said oxidant stream as the streams travel downstream in said mixing section to form a reactant stream,
        wherein the angle between the longitudinal axis of the mixing section and the longitudinal axis of the inlet chamber is such that the reactant stream which exits the mixing section and enters the inlet chamber at the reactant inlet flows towards the lower end of said inlet chamber.

2. The reactor of claim 1 wherein the angle between the longitudinal axis of the mixing section and the longitudinal axis of the inlet chamber is between 30° and 60°.

3. The reactor of claim 1 further comprising a mixing device disposed within said mixing section, wherein said mixing device comprises one or more spiral members, a mixing plate or a secondary flow conditioner, said flow conditioner comprising a permeable mixing material having a plurality of interstitial pathways.

4. The reactor of claim 1 wherein said pressure relief device has a central axis aligned with the longitudinal axis of said reactor body.

5. A mixing device for supplying a mixture of a fuel and an oxidant to a partial oxidation reactor, the device comprising:
    a pressure relief device;
    a tubular reactor inlet chamber having a lower end connected to a reactor inlet and an upper end having an outlet in fluid communication to said pressure relief device, said tubular reactor inlet chamber further comprising a reactant gas inlet located at a distance from the lower end of the tubular inlet chamber of at least twice the diameter of the tubular inlet chamber;
    a tubular mixing section connected to said reactor inlet chamber at said reactant gas inlet, wherein the longitudinal axis of said mixing section is at an angle less than 90° to the longitudinal axis of said inlet chamber, wherein the mixing section and the inlet chamber are arranged in such a manner to provide a substantially unobstructed path between the reactor inlet and the pressure relief device;
    an oxidant axial inlet adapted to inject the oxidant into said mixing section along the longitudinal axis of said mixing section; and
    a fuel inlet adapted to inject the fuel into an annular area located in said mixing section between the oxidant axial inlet and the inside wall of the tubular mixing section,
    wherein the angle between the longitudinal axis of the mixing section and the longitudinal axis of the inlet chamber is such that the fuel and oxidant exiting the mixing section and entering the inlet chamber at the reactant gas inlet flow towards the lower end of said inlet chamber.

6. The mixing device of claim 5 wherein said fuel inlet is adapted to inject the fuel tangentially to the axial inlet.

7. The mixing device of claim 5 wherein said fuel inlet is adapted to inject the fuel parallel to the axial inlet.

8. The mixing device of claim 5 wherein the angle between the longitudinal axis of the mixing section and the longitudinal axis of the inlet chamber is between 30° and 60°.

9. The mixing device of claim 5 wherein said reactor inlet chamber is substantially free of obstructions between the lower end and the upper end.

10. The mixing device of claim 5 further comprising a flow conditioner disposed within said mixing section between the reactant gas inlet of said inlet chamber and said oxidant axial inlet.

11. The mixing device of claim 10 wherein said flow conditioner comprises a permeable mixing material selected from the group consisting of ceramic beads, ceramic foam and packing saddles.

12. The reactor of claim 1 further comprising a means for injecting a sweep gas in the area of the inlet chamber located between the reactant inlet and the pressure relief device.

13. The reactor of claim 1 wherein the inlet chamber is tubular, and the reactant inlet is located at a distance from the lower end of the tubular inlet chamber of at least twice the diameter of the tubular inlet chamber.

14. The reactor of claim 1 further comprising a secondary flow conditioner disposed within said mixing section between the fuel inlet and the reactant inlet, said flow conditioner comprising a permeable mixing material selected from the group consisting of ceramic beads, ceramic foam and packing saddles.

15. The reactor of claim 3 wherein said flow conditioner is located in the downstream end of said mixing section.

16. The reactor of claim 1 wherein the reactor comprises multiple mixing sections.

17. The mixing device of claim 7 wherein the oxidant axial inlet and fuel inlets are arranged in said mixing section in such a manner that the oxidant and the fuel mix once they enter the inlet chamber at the reactant gas inlet.

18. The mixing device of claim 7 wherein the fuel inlet comprises one or more spirals wrapped around the oxidant axial inlet in such a manner to impart the fuel a swirling motion as the fuel passes through the fuel inlet and enters the inlet chamber, said swirling motion of the fuel causing the oxidant and fuel to mix once they enter the inlet chamber at the reactant inlet.

19. The mixing device of claim 7 wherein the mixing section further comprises a mixing plate having a plurality of orifices, said mixing plate being disposed in the mixing section and positioned in such a manner to allow free flow of the oxidant therethrough and to interrupt the flow of the fuel by said plurality of orifices in order to create a turbulent flow in the fuel as the fuel moves out of the mixing section into the inlet chamber.

20. The mixing device of claim 5 wherein the inlet chamber further includes a sweep gas inlet, said sweep gas inlet being adapted to inject a sweep gas in the area of the mixing chamber located between the reactant gas inlet and the outlet.

21. The mixing device of claim 5 wherein the inlet chamber further comprises additional mixing equipment disposed at or close to the inner wall of the inlet chamber in the area of the inlet chamber located between the reactant gas inlet and the reactor inlet so as not to interfere with the unobstructed path between the reactor inlet and the pressure relief device.

* * * * *